(12) United States Patent
Oertley et al.

(10) Patent No.: US 6,220,378 B1
(45) Date of Patent: *Apr. 24, 2001

(54) DRIVE MECHANISM FOR A TRACK TYPE WORK MACHINE HAVING ENHANCED DURABILITY

(75) Inventors: Thomas E. Oertley, Dunlap; Delbert D. Dester, Washington; J. Scott Burdick, North Pekin; Kevin M. Egle, Peoria, all of IL (US)

(73) Assignee: Caterpillar Inc., Peoria, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,481

(22) Filed: Jan. 6, 1998

(51) Int. Cl.⁷ .................................................. B62D 55/12
(52) U.S. Cl. ........................ 180/9.62; 305/201; 305/198
(58) Field of Search ................................... 305/193, 194, 305/195, 196, 198, 199, 187, 201, 202; 180/9.62

(56) References Cited

U.S. PATENT DOCUMENTS

| | | | |
|---|---|---|---|
| 1,290,586 | * 1/1919 | Lambert | 305/201 |
| 1,432,167 | * 10/1922 | Enos | 305/201 |
| 1,790,098 | * 1/1931 | Kegresse | 305/195 |
| 2,050,845 | * 8/1936 | Jett | 305/195 |
| 2,425,219 | 8/1947 | Armington | 305/10 |
| 2,513,265 | 6/1950 | Jones | 305/9 |
| 2,599,233 | 6/1952 | Christie . | |
| 3,051,531 | 8/1962 | Tucker, Sr. | 305/50 |
| 3,357,750 | 12/1967 | Reynolds et al. | 305/11 |
| 3,563,614 | * 2/1971 | Parks | 305/54 |
| 3,575,474 | 4/1971 | Russ, Sr. | 305/35 EB |
| 3,720,448 | 3/1973 | Allen et al. | 305/19 |
| 3,722,962 | 3/1973 | Cooper | 305/35 EB |
| 3,762,780 | 10/1973 | Tomizawa | 305/46 |
| 3,955,855 | 5/1976 | Massieon et al. | 305/38 |
| 3,996,810 | 12/1976 | Groff | 74/230.3 |
| 4,123,120 | 10/1978 | Kohriyama | 305/41 |
| 4,241,956 | 12/1980 | Meisel, Jr. | 305/35 EB |
| 4,306,753 | * 12/1981 | Livesay et al. | 305/195 |
| 4,402,555 | 9/1983 | Ogaki et al. | 305/11 |
| 4,817,746 | 4/1989 | Purcell et al. | 180/9.1 |
| 4,871,216 | 10/1989 | Cory | 305/58 R |
| 5,018,591 | 5/1991 | Price | 180/9.5 |
| 5,072,800 | 12/1991 | Price | 180/9.48 |

(List continued on next page.)

FOREIGN PATENT DOCUMENTS 2002653  11/1993  (SU) .............................. B62D/55/12
WO9311022  6/1993  (WO) .

Primary Examiner—J. J. Swann
Assistant Examiner—Michael Cuff
(74) Attorney, Agent, or Firm—Maginot, Addison & Moore

(57) ABSTRACT

A drive mechanism includes a sprocket drive assembly which includes a hub, and a plurality of engagement members each being supported by the hub. The drive mechanism further includes a track assembly having a plurality of shoes which are secured to one another to form a track, and a plurality of drive lugs which are mounted to the plurality of shoes. The drive lugs engage the plurality of engagement members when the hub is rotated. Each of the drive lugs includes a left lateral rail segment and a right lateral rail segment. The track assembly further includes a support roller mechanically coupled to a chassis of the work machine. The support roller includes a left wheel and a right wheel. The left wheel is supported by the left lateral rail segment during advancement of the track. The right wheel is supported by the right lateral rail segment during advancement of the track.

18 Claims, 9 Drawing Sheets

U.S. PATENT DOCUMENTS

| | | | |
|---|---|---|---|
| 5,288,143 | 2/1994 | Dester et al. | 305/56 |
| 5,312,176 | 5/1994 | Crabb | 305/21 |
| 5,352,029 | 10/1994 | Nagorcka | 305/39 |
| 5,368,115 | 11/1994 | Crabb | 180/9.1 |
| 5,373,909 | 12/1994 | Dow et al. | 180/9.1 |
| 5,409,306 | 4/1995 | Bentz | 305/39 |
| 5,482,364 | 1/1996 | Edwards et al. | 305/39 |
| 6,120,405 * | 9/2000 | Oertley et al. | 474/156 |

* cited by examiner

DRIVE MECHANISM FOR A TRACK TYPE WORK MACHINE HAVING ENHANCED DURABILITY

TECHNICAL FIELD OF THE INVENTION

The present invention relates generally to drive mechanism for a track type work machine and more specifically to drive mechanism for a track type work machine which has enhanced durability.

BACKGROUND OF THE INVENTION

Work machines which utilize a track type drive mechanism have several advantages over wheel type work machines. For instance, the tracks give the work machine excellent traction by spreading the weight of the machine over a large area. Thus, the track type work machine has enhanced off road capabilities.

A typical undercarriage of a track type drive mechanism consists of a track having of a number of shoes linked together, a sprocket which drives the track, and a number of rollers which distribute the weight of the work machine along the track.

The shoes include a drive lug, and a number of links. The drive lugs engage the drive sprocket in order to advance the track. The links pivotably couple each shoe to the adjacent shoes so as to allow the track to advance in along an oval path.

Certain track configurations support the weight of the work machine on the number of links. In particular, the number of rollers are rotatably supported by the links during advancement of the track. A disadvantage to such a configuration is that the stress of advancing the track around the work machine and the stress of supporting the weight of the work machine are combined which may decrease the useful life of the number of links.

A further disadvantage to such a configuration is that the various wear surfaces of each of the links cannot be replaced independently of each other. In some abrasive environments, such as environments which include sand, the upper surface of the links which is in contact with the rollers are subjected wear at a greater rate than the surfaces of the links which pivotably couple the links together. Thus, it is likely that wear on the upper surface would require the entire link to be replaced even though the surfaces that pivotably couple the links together still possess significant useful life.

What is needed therefore is an apparatus and method for driving a track type work machine which overcomes one or more of the above-mentioned drawbacks.

DISCLOSURE OF THE INVENTION

In accordance with a first embodiment of the present invention, there is provided a drive mechanism for a work machine. The drive mechanism includes a sprocket drive assembly which includes a hub, and a plurality of engagement members each being supported by the hub. The drive mechanism further includes a track assembly having a plurality of shoes which are secured to one another to form a track and a plurality of drive lugs which are mounted to the plurality of shoes. The drive lugs engage the plurality of engagement members when the hub is rotated. The track assembly further has a support roller mechanically coupled to a chassis of the work machine. Each of the drive lugs includes a rail segment on which the support roller is supported during advancement of the track.

In accordance with a second embodiment of the present invention, there is provided a drive mechanism for a work machine. The drive mechanism includes a sprocket drive assembly which includes a hub, and a plurality of engagement members each being supported by the hub. The drive mechanism further includes a track assembly having a plurality of shoes which are secured to one another to form a track, and a plurality of drive lugs which are mounted to the plurality of shoes. The drive lugs engage the plurality of engagement members when the hub is rotated. Each of the drive lugs includes a left lateral rail segment and a right lateral rail segment. The track assembly further includes a support roller mechanically coupled to a chassis of the work machine. The support roller includes a left wheel and a right wheel. The left wheel is supported by the left lateral rail segment during advancement of the track. The right wheel is supported by the right lateral rail segment during advancement of the track.

BEST MODE FOR CARRYING OUT THE INVENTION

Figure 1:
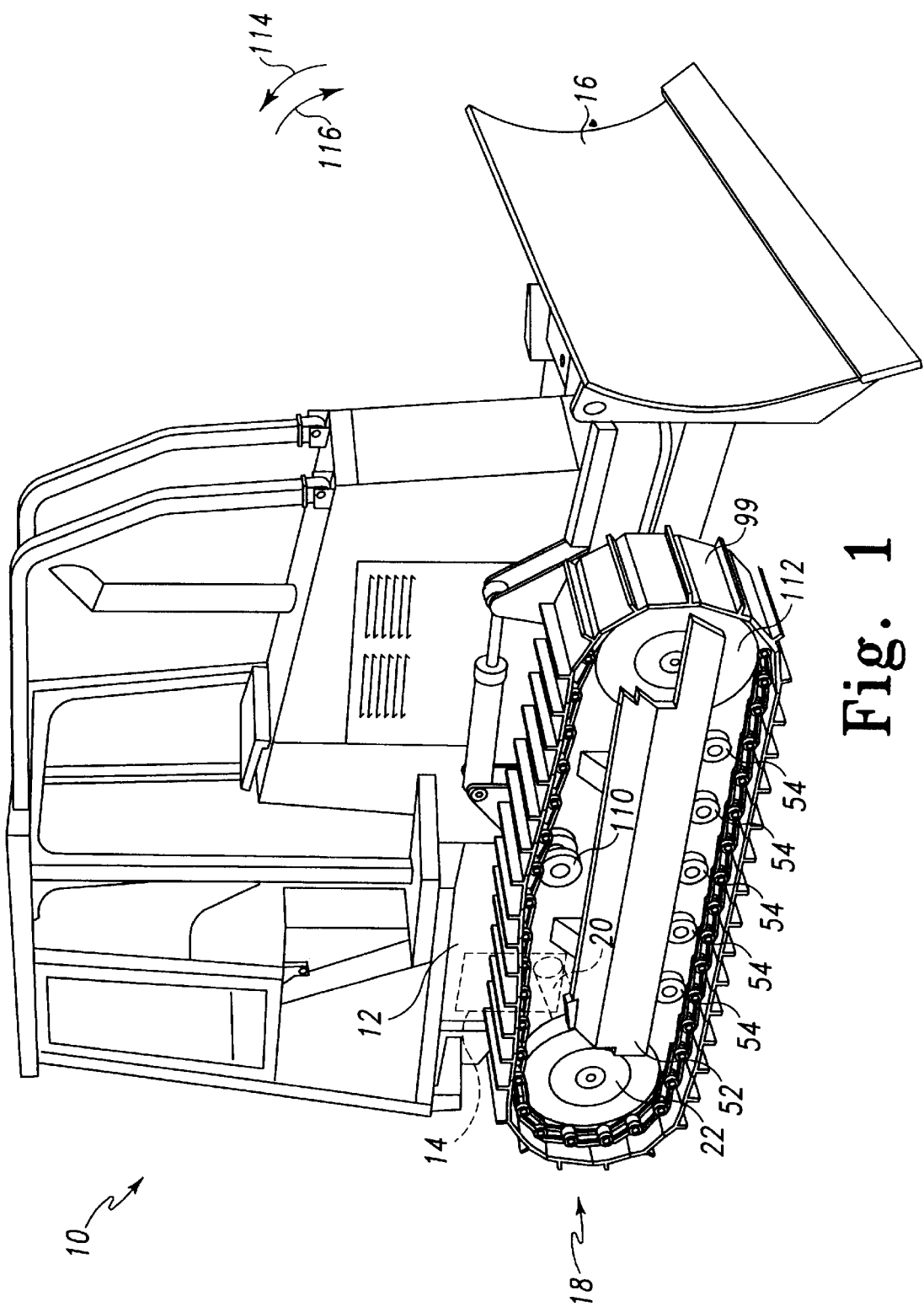
FIG. 1 is a perspective view of a tracked type work machine which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a tracked type work machine 10 which incorporates the features of the present invention therein. The work machine 10 includes a chassis 12, an engine assembly 14, a work implement 16 and a track drive mechanism 18. It should be noted that the work machine 10 further includes a second track drive mechanism (not shown) substantially identical to the mechanical configuration of the track drive mechanism 18 shown in FIG. 1. As a result, only the track drive mechanism 18 is described in detail.

Figure 2:
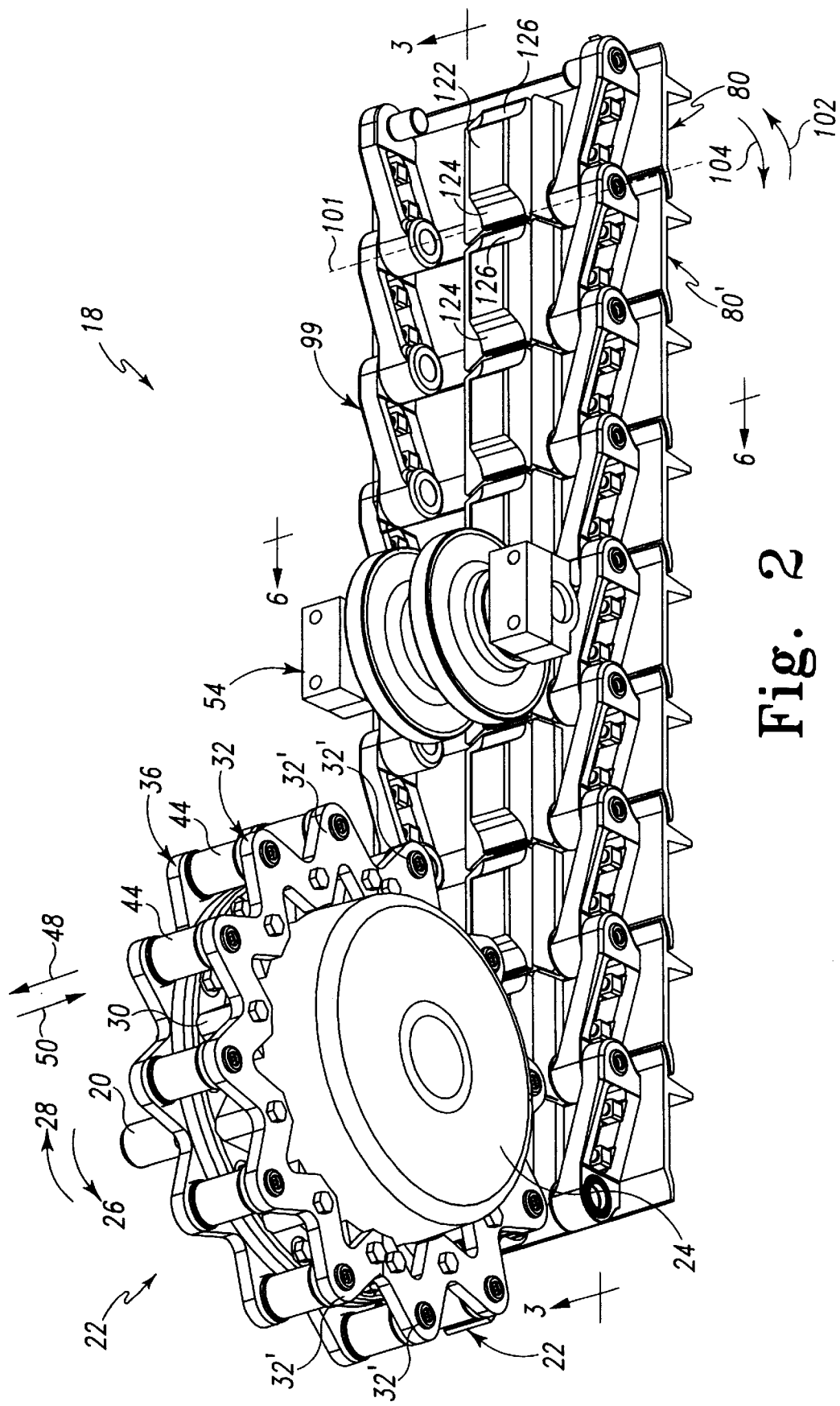
FIG. 2 is a perspective view of a drive sprocket, a roller assembly, and a portion of the track assembly of the work machine of FIG. 1.

The engine assembly 14 is mounted to the chassis 12. The engine assembly 14 includes an engine (not shown) and a transmission (not shown). The engine generates mechanical energy which is transferred to the transmission which outputs the mechanical energy to a drive shaft 20 as shown in FIG. 2. The transmission allows an operator to selectively change the gear ratios between the engine and the drive shaft 20. The change of ratios allows the engine assembly 14 to provide a range of torque outputs to the track drive mechanism 18 for various operating conditions. In particular, high torque may be required at low speeds whereas low torque may be required at high speeds.

Referring now to FIG. 2, the track drive mechanism 18 includes a drive sprocket 22. The drive sprocket 22 includes a hub 24 which is mechanically coupled to the drive shaft 20, such that rotation of the drive shaft 20 in the general direction of arrow 26 causes the hub 24 to rotate in the general direction of arrow 26, whereas rotation of the drive shaft 20 in the general direction of arrow 28 causes the hub 24 to rotate in the general direction of arrow 28. The outer surface of the hub 24 includes twelve mounting tabs 30 defined thereon. Each of the mounting tabs 30 projects radially outward from the center of the hub 24.

Figure 8:
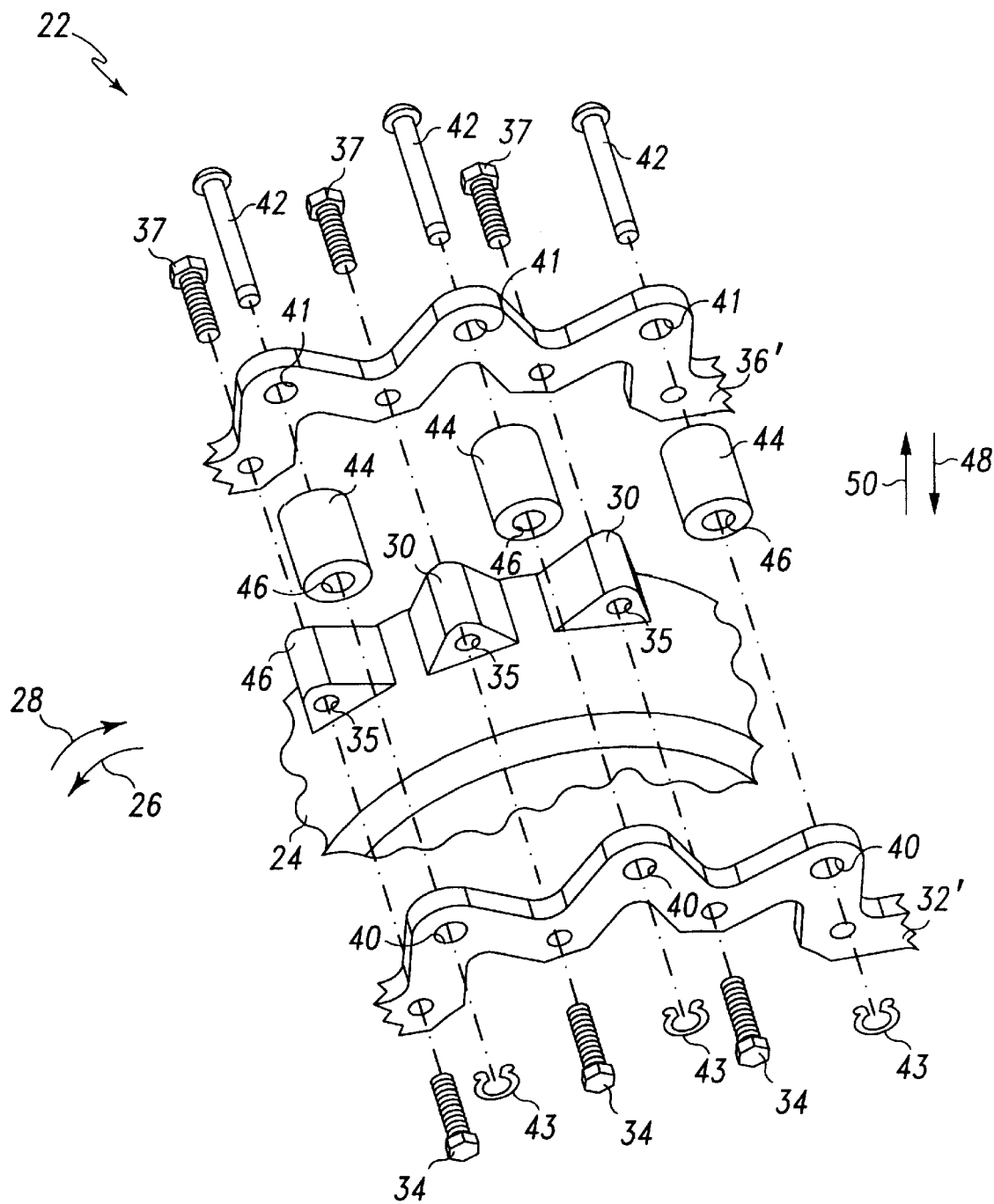
FIG. 8 is a fragmentary exploded view of the drive sprocket of FIG. 2.

Referring now to FIG. 8, the drive sprocket 22 further includes a first side support 32 secured to the hub 24. In particular, the first side plate 32 is secured to each of the tabs 30 by a fastener, such as a bolt 34. More specifically, the bolt 34 is inserted through an aperture in the first side support 32 and received into a threaded aperture 35 defined in the right side of each of the tabs 30. It should be appreciated that the first side support plate 32 is embodied as a two of separate components as shown in FIG. 2 in order to facilitate maintenance of the drive sprocket 22. In particular, the first side support plate 32 is composed of two semi circular portions 32' so as to allow one semi circular portion 32' of the first support plate 32 to be removed, while the other semicircular portion 32' remains secured to the hub 24.

The drive sprocket 22 further includes a second side support 36 secured to the hub 24. In a manner similar to the first side plate 32, the second side plate 36 is secured to each of the tabs 30 by a fastener, such as a bolt 37. More specifically, the bolt 37 is inserted through an aperture in the second side support 36 and received into a threaded aperture 38 shown in FIG. 3 defined in the left side of each of the tabs 30. It should be appreciated that the second side support plate 36 is embodied as a two of separate components in order to facilitate maintenance of the drive sprocket 22. In particular, the second side support plate 36 is composed of two semi circular portions 36' shown in FIG. 3 so as to allow one semi circular portion 36' of the second support plate 36 to be removed, while the other semicircular portion 36' remains secured to the hub 24.

The first side support plate 32 includes twelve projections, each of which has a pin aperture 40 defined therethrough. Similarly, each of the second side support plates 36 has twelve projections, each of which has a pin apertures 41 defined therethrough.

A bushing or engagement member 44 is configured to span the distance between the first engagement plate 32 and the second engagement plate 36 between the aperture 40 of the first engagement plate 32 and the aperture 41 of the second engagement plate 36. In particular, the engagement member 44 is rotatably secured to both the first side support plate 32 and the second side support plate 36. More specifically, each engagement member 44 has a pin opening 46 defined therethrough (see FIG. 8). A pin 42 is received through the aperture 41 in the second side support 36, through the pin opening 46 of the engagement member 44, and through the aperture 40 of the first side support plate 32. Furthermore, a pin fastener 43 secures the pin 42 to the first side support 32 and the second side support 36 such that the pin 42 is prevented from moving in the general direction of arrows 48 and 50. It should be appreciated that each of the twelve engagement members 44 are free to rotate relative to the respective pin 42 in the general direction of arrows 26 and 28.

Referring now to FIG. 1, the work machine 10 further includes a roller frame 52 welded to the chassis 12. Five roller assemblies 54 are attached to the underside of the roller frame 52.

Figure 7:
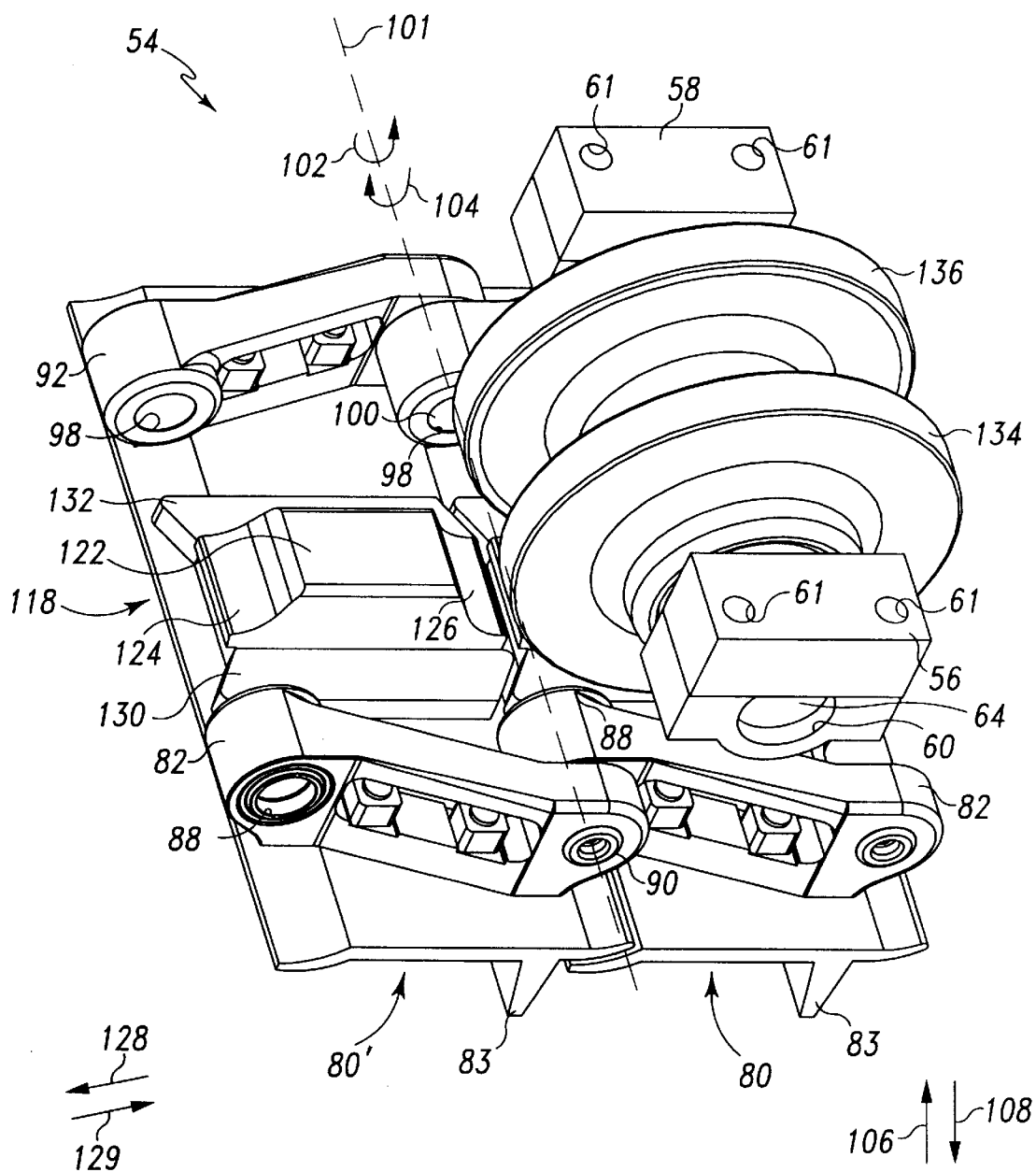
FIG. 7 is a perspective view of a roller supported by a shoe assembly of the track assembly shown in FIG. 2.

Referring now to FIG. 7, each roller assembly 54 includes a right roller mount 56 and a left roller mount 58. The right roller mount 56 has two fastener apertures 61 defined therein which allows a fastener (not shown) to secure the right roller mount 56 to the underside of the roller frame 52. Similarly, the left roller mount 58 has two fastener apertures 61 defined therein which allows a fastener (not shown) to secure the left roller mount 58 to the underside of the roller frame 52. Moreover, the right roller mount 56 includes a right axle aperture 60 defined in the lower portion of the right roller mount 56 whereas the left roller mount 58 includes a left axle aperture 59 defined in the lower portion of the left roller mount 56.

Figure 6:
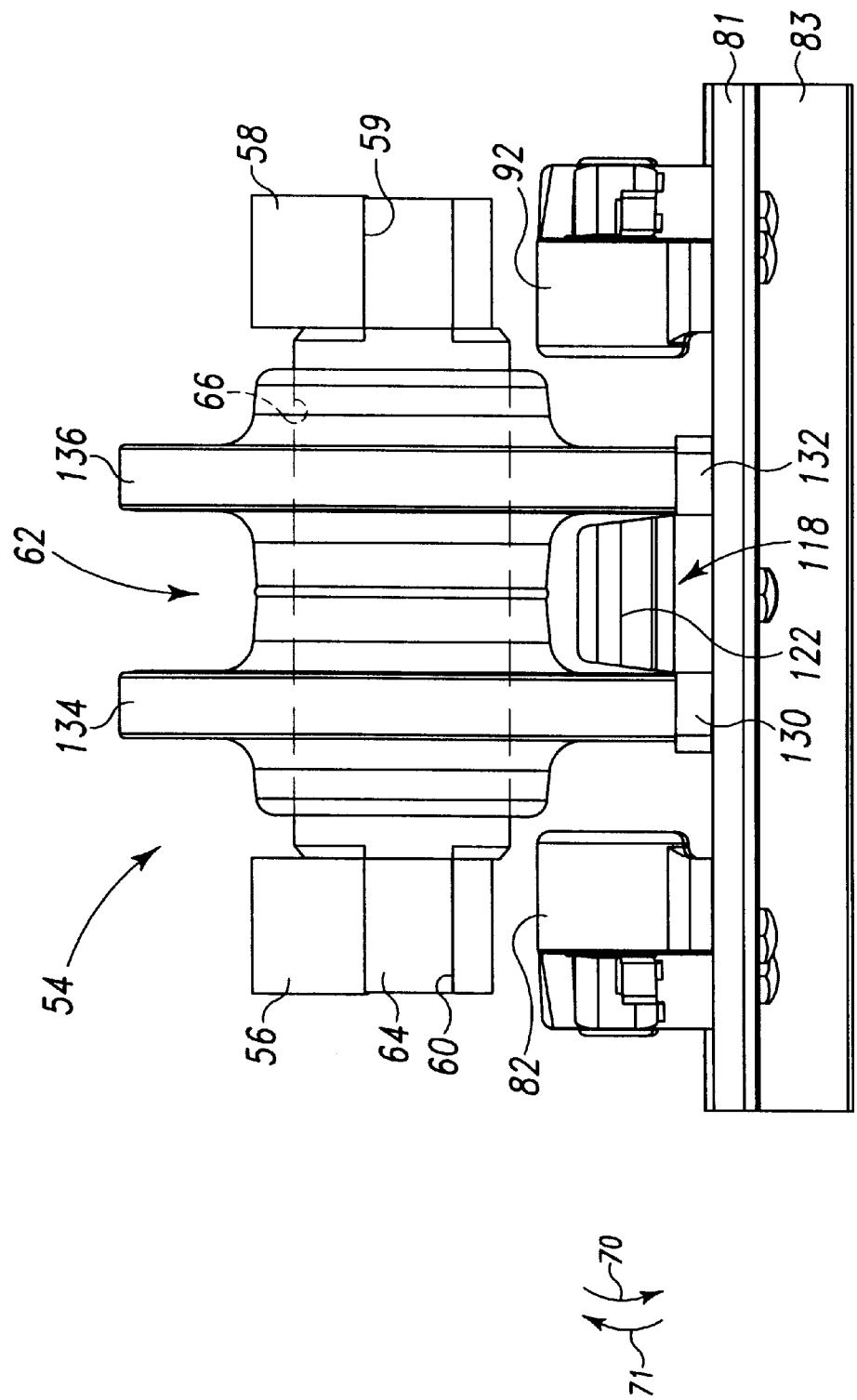
FIG. 6 is a front elevational view of a roller assembly positioned on the track assembly of FIG. 2 as viewed along the line 2—2 in the direction of the arrows.

Referring now to FIGS. 6 and 7, the roller assembly 54 further includes a roller 62 and an axle 64. The roller 62 has an axle aperture 66 shown in FIG. 6 defined therein. In particular, the axle 64 is received through the axle aperture 66. More specifically, a set of bearings (not shown) are interposed between the axle 64 and the axle aperture 66 in order to reduce frictional losses between the axle 64 and the roller 62. Furthermore, the roller 62 is free to rotate relative to the axle 64 in the general directions of arrows 70 and 72.

A right end of the roller axle 64 is then secured to the right axle aperture 60 defined in the lower portion of the right roller mount 56 whereas a left end of the roller axle 64 is secured to the left axle aperture 59 defined in the lower portion of the left roller mount 58. Thus, the roller assembly 54 is secured to the roller frame 52, and the roller 62 is free to rotate relative to the roller frame 52 in the general direction of arrows 70 and 72. It should be appreciated that work machine 10 includes five roller assemblies secured to the roller frame 52 each of which are substantially identical in configuration.

Figure 4:
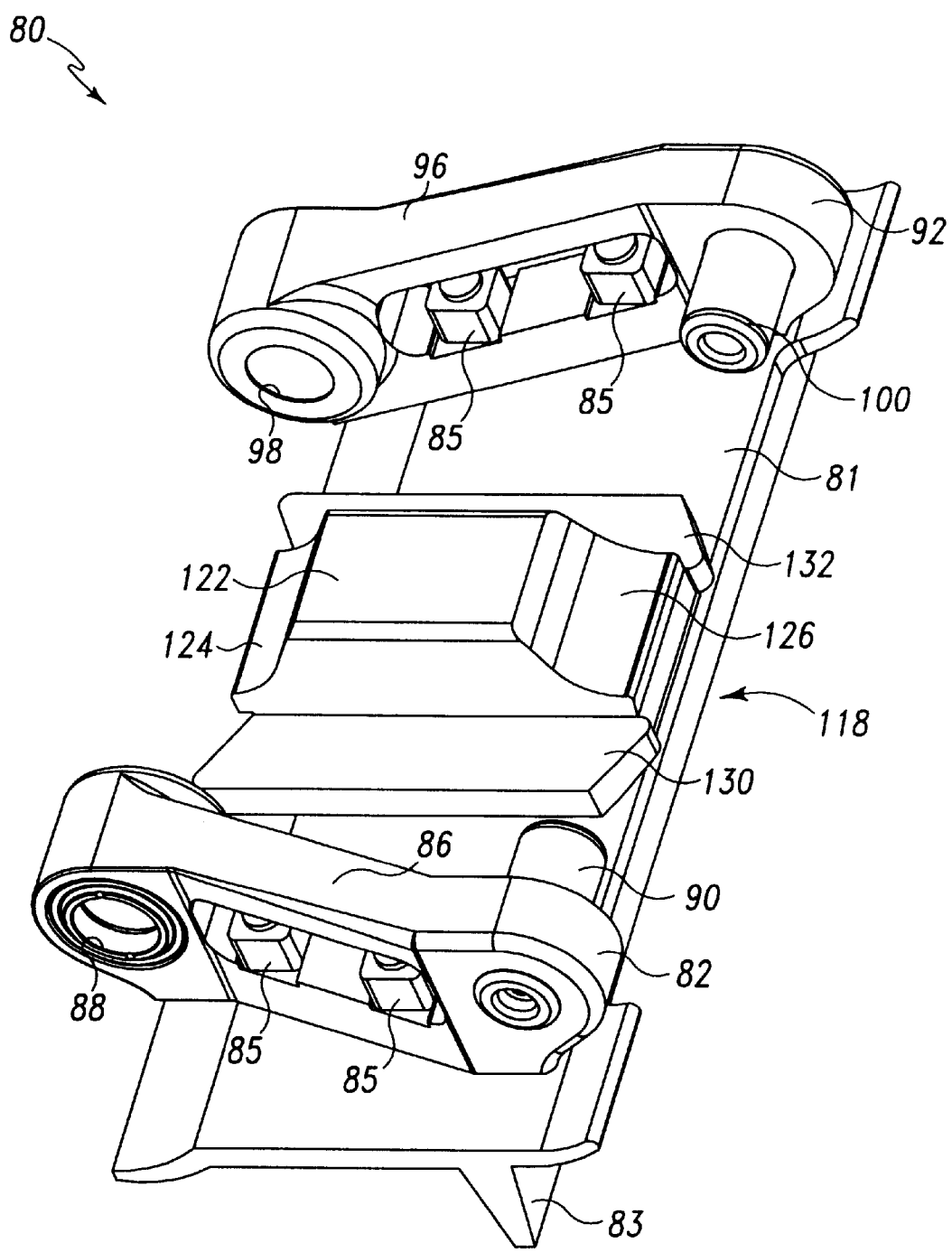
FIG. 4 is a perspective view of a shoe assembly of the track assembly of FIG. 2.
Figure 5:
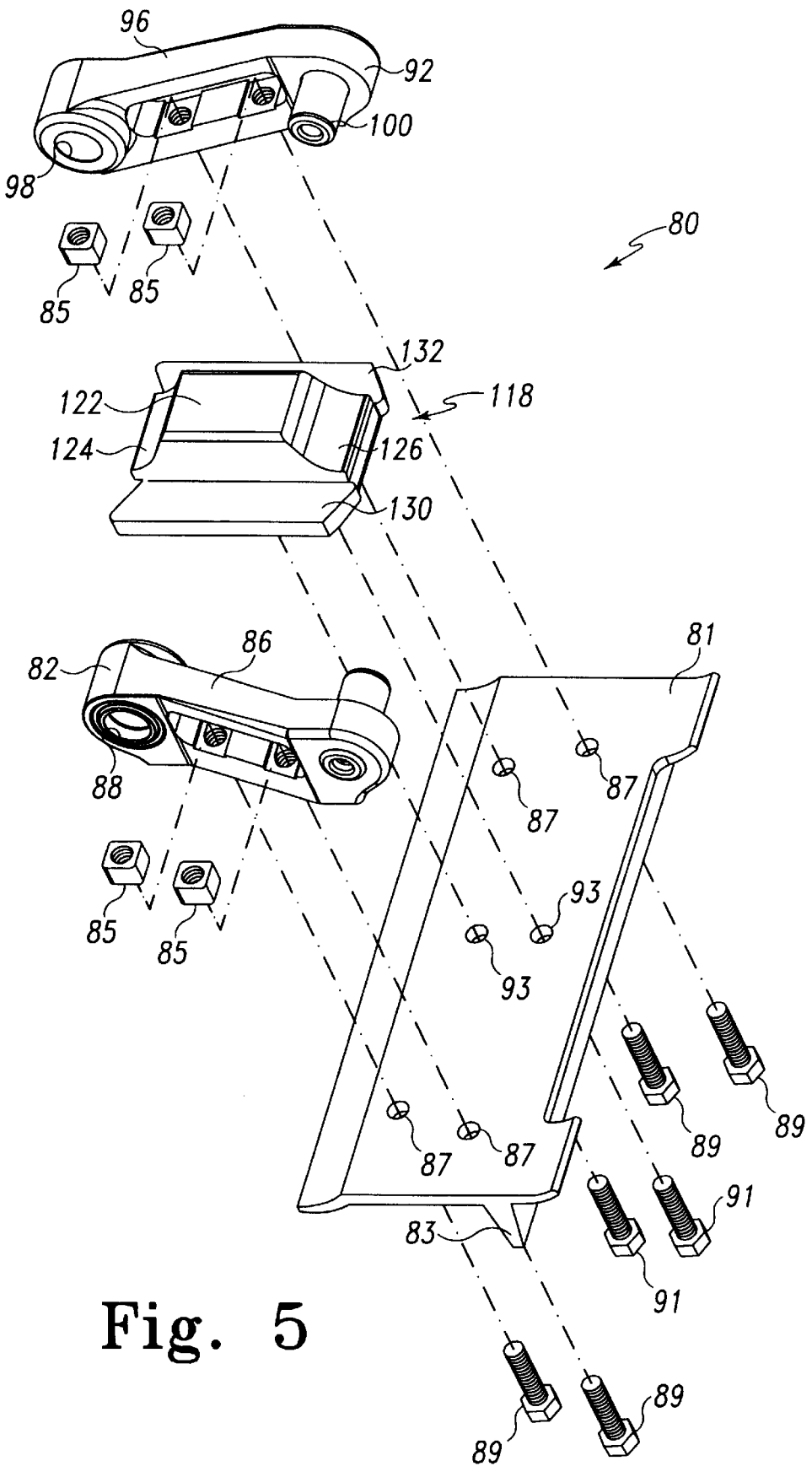
FIG. 5 is an exploded view of the shoe assembly of FIG. 4.

Referring now to FIGS. 4 and 5, the tracked drive mechanism 18 includes thirty seven shoe assemblies 80. Each shoe assembly 80 includes a shoe 81, a right link 82 and a left link 92. The shoe 81 has a tread 83 defined therein. The tread 83 projects downwardly from the main body of the shoe 81.

The right link 82 includes a right link strap 86, a right pin receptacle 88, and a right link pin 90. The right link 82 is secured to the shoe 81. In particular, the right link strap 86 of the right link 82 is secured to the shoe 81 by a pair of fasteners such as bolts 89 received through a pair of apertures 87 and secured to a pair of nuts 85.

In a similar manner, the left link 92 includes a left link strap 96, a left pin receptacle 98, and a left link pin 100. The left link 92 is secured to the shoe 81. In particular, the left link strap 96 of the left link 92 is secured to the shoe 81 by a pair of fasteners such as bolts 98 received through a pair of apertures 87 and secured to a pair of nuts 85.

In order to form a track assembly 99, thirty seven shoe assemblies 80 are linked together as shown in FIG. 1. In particular, the right link pin 90 of a first shoe assembly 80 is configured to be received by the right pin receptacle 88 of an adjacent shoe assembly 80' as shown in FIG. 7. It should be appreciated that the right link pin 90 allows the first shoe assembly 80 to rotate relative to the second shoe assembly 80' at the right link pin 90 in the general direction of arrows 102 and 104. Furthermore, the right pin receptacle 88 of the first shoe assembly 80 prevents movement of the second shoe assembly 80' in the general direction of arrows 108, while permitting movement of the second shoe assembly 80' with respect to the first shoe assembly 80 in the general direction of arrow 106.

Similarly, the left link pin 100 of a first shoe assembly 80 is configured to be received by the left pin receptacle 98 of an adjacent shoe assembly 80' as shown in FIG. 7. It should be appreciated that the left link pin 100 allows the first shoe assembly 80 to rotate relative to the second shoe assembly 80' in the general direction of arrows 102 and 104. Furthermore, the right pin receptacle 98 of the first shoe assembly 80 prevents movement of the second shoe assembly 80' in the general direction of arrows 106, while permitting movement of the second shoe assembly 80' with respect to the first shoe assembly 80 in the general direction of arrow 108.

It should be appreciated that the right pin receptacle 88 of the first shoe assembly 80 prevents the movement of the right link 82 of the second shoe assembly 80' in the general direction of arrow 106 whereas the left pin receptacle 98 of the first shoe assembly 80 prevents the movement of the left link 92 of the second shoe assembly 80' in the general direction of arrow 108. Thus, when the right link 82 of the first shoe assembly 80 is coupled to the right link 82 of an adjacent second link 80' and the left link 92 of the first shoe assembly 80 is coupled to the left link 92 of the adjacent second shoe assembly 80', the first shoe assembly 80 is coupled to the second shoe assembly 80' such that the second shoe assembly 80' can only rotate relative to the link pins 90, 100 in the general directions of arrows 102 and 104 and is restricted from moving in either the general direction of arrow 106 or the general direction of arrow 108. It should further be appreciated that the right link pin 90 and the left link pin 100 share a common pivot axis 101. The first shoe assembly 80 rotates about the pivot axis 101 as the first shoe assembly 80 moves relative to the second shoe assembly 80'.

Referring now to FIG. 1, the track drive assembly 18 further includes a carrier roller 110 and an idler roller 112. The carrier roller 110 is rotatably coupled to the chassis 12 of the work machine 10 such that the carrier roller 110 is free to rotate relative to the work machine 10 in the general direction of arrows 114 and 116. The idler roller 112 is rotatably secured to the roller frame 52 such the idler roller 112 is free to rotate relative to the roller frame 52 in the general direction of arrows 114 and 116. It should be appreciated that the drive sprocket 22, the carrier roller 110, the idler roller 112, and the five rollers assemblies 54 define a generally oval path around the roller frame 52.

It should be appreciated that thirty seven shoe assemblies 80 are required to form a track assembly 99. It should further be appreciated that the last shoe assembly is linked to the first shoe assembly in order to form the generally oval shape track assembly 99. It should still further be appreciated that the track assembly 99 extends around the oval path defined by drive sprocket 22, the carrier roller 110, the idler roller 112, and the five rollers assemblies 54.

Referring now to FIGS. 4, 5, and 7, the shoe assembly 80 further includes a drive lug 118 secured to the shoe 81. In particular, a pair of bolts 91 are inserted through a pair of apertures 93 in the shoe 81 and rotatably received through a threaded aperture (not shown) on the underside of the drive lug 118 as shown in FIG. 5.

The drive lug 118 includes a central drive segment 122 which has a first grasping notch 124 and a second grasping notch 126 defined therein. It should be appreciated that the first grasping notch 124 of a shoe assembly 80 lies proximate to the second grasping notch 126 of an adjacent shoe assembly 80' as shown in FIG. 2. It should further be appreciated that the pivot axis 101 lies between the first gasping notch 124 of a first shoe assembly 80 and the second grasping notch 126 of an adjacent second shoe assembly 80' such that when the second shoe assembly 80' is rotated relative to the first shoe assembly 80 about the pivot axis 101 in the general direction of arrow 104, the upper portion of the second grasping notch 126 of the second shoe assembly 80' is moved toward the upper portion of the first grasping notch 124 of the first shoe assembly 80. Similarly, when second shoe assembly 80' is rotated relative to the first shoe assembly 80 about the pivot axis 101 in the general direction of arrow 102, the upper portion of the second grasping notch 126 of the second shoe assembly 80' is moved away from the upper portion of the first grasping notch 124 of the first shoe assembly 80.

Figure 3:
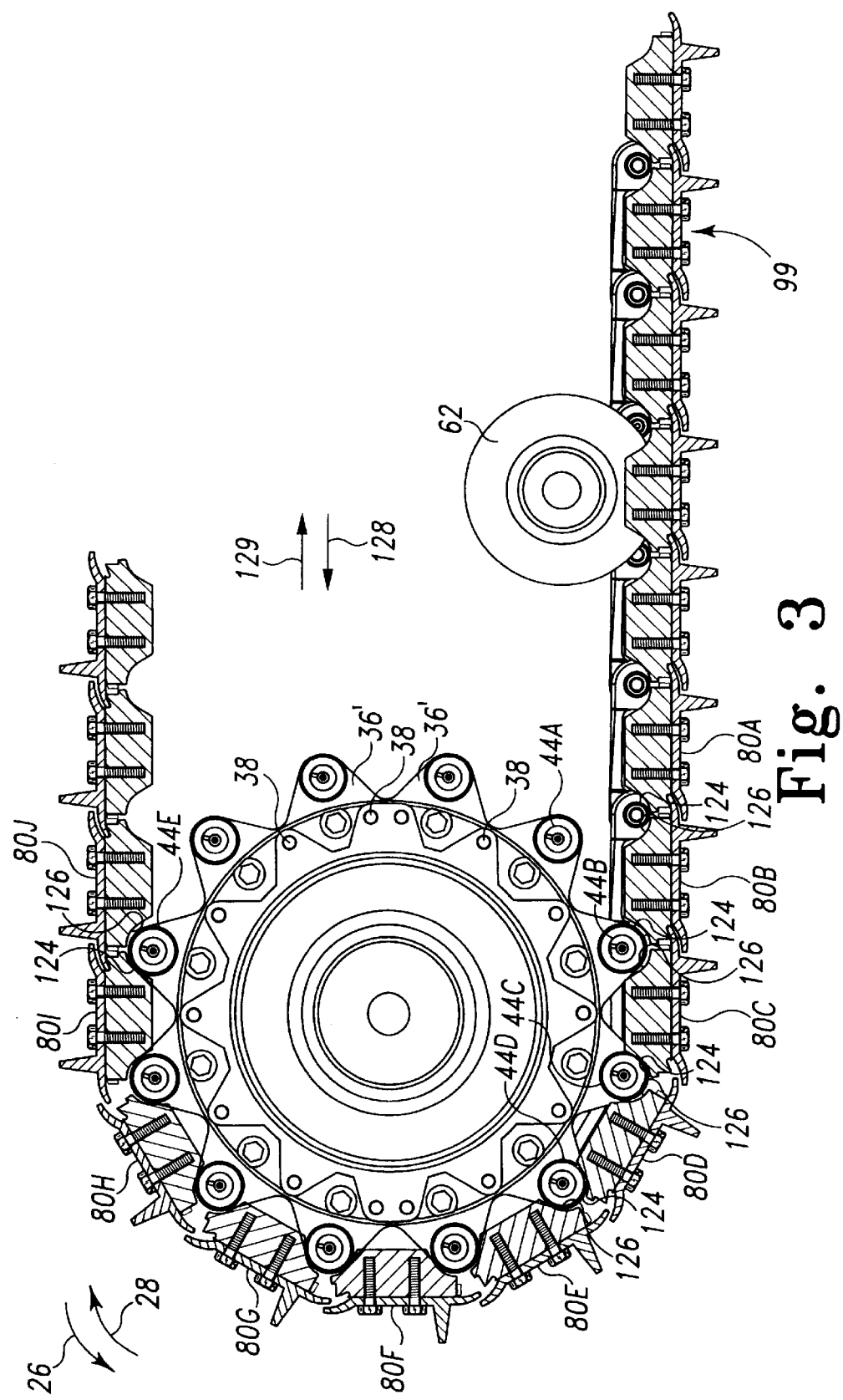
FIG. 3 is a cross sectional view of the drive sprocket, the roller assembly, and the portion of the track shown in FIG. 2 as view along the line 2—2 of FIG. 2 in the direction of the arrows.

Referring now to FIG. 3, as the drive sprocket is rotated in the general direction of arrow 28, the lower portion of the track assembly 99 engages the engagement members 44 of the drive sprocket 22 as the lower portion of the track is advanced in the general direction of arrow 128. In particular, pairs of shoe assemblies 80 cooperate to engage a respective engagement member 44 of the drive sprocket 22. Similarly, the upper portion of the track assembly 99 disengages an engagement member 44 of the drive sprocket 22 as the upper portion of the track assembly 99 advances in the general direction of arrow 129.

Shoe assemblies 80A through 80J show the progressive stages of the track assembly 99 engaging and disengaging a respective engagement member 44 of the drive sprocket 22. Shoe assembly 80A and shoe assembly 80B are not engaged with the drive sprocket 22. However, the shoe assembly 80A and the shoe assembly 80B are being positioned to engage the engagement member 44A. In particular, as the engagement member 44A is moving in the general direction of arrow 28, the engagement member is being positioned between the first grasping notch 124 of the shoe assembly 80A and the second grasping notch 126 of the shoe assembly 80B.

As the drive sprocket 22 advances in the general direction of arrow 28, a pair of shoe assemblies is moved into a position shown by shoe assembly 80B and 80C. In this position, the rotation of the drive sprocket 22 places the engagement member 44B between the shoe assembly 80B and the shoe assembly 80C. In particular, the engagement member 44B is positioned between the first grasping notch 124 of the shoe assembly 80B and the second grasping notch 126 of the shoe assembly 80C. It should be appreciated that the engagement member 44B is positioned between the shoe assembly 80B and the shoe assembly 80C. However, the engagement member 44B is not engaged to the track assembly 99.

As the drive sprocket 22 advances in the general direction of arrow 28, a pair of shoe assemblies are moved into a position shown by shoe assembly 80C and 80D. As the shoe assembly 80D moves around the drive sprocket 22, the shoe assembly 80D rotates relative to the shoe assembly 80C in the general direction of arrow 104 about the pivot axis 101 defined by the right link pin 90 and the left link pin 100 as shown in FIG. 2. As discussed above, when the shoe assembly 80D rotates relative to an adjacent shoe assembly 80C, the upper portion of the second grasping notch 126 of the shoe assembly 80D is moved toward the upper portion of the first grasping notch 126 of the shoe assembly 80C.

As the second grasping notch 124 of the shoe assembly 80D moves toward the grasping notch 126 of the shoe assembly 80C, the track assembly 99 engages the engagement member 44C of the drive sprocket 22. In particular, the first grasping notch 124 of the shoe assembly 80C applies a force against the engagement member 44C in the general direction of arrow 104 whereas the second grasping notch 126 of the shoe assembly 80D applies a force against the engagement member 44C in the general direction of arrow 102. Thus, the engagement member 44C is engaged to the track assembly 99 by the first grasping notch 124 of the shoe assembly 80C and second grasping notch 126 of the shoe assembly 80D.

It should be appreciated that as the drive sprocket 22 advances in the general direction of arrow 28, a pair of shoe assemblies remains engaged to the sprocket 22 until the pair of shoe assemblies are moved into a position shown by shoe assembly 80H and shoe assembly 80I. It should still further be appreciated that the engagement of the track assembly 99 to a rotating engagement member 44 allows the engagement member 44 to remain engaged to the track assembly 99 even though the engagement member 44 may rotate relative to the drive sprocket 22 thus preventing the sliding contact between the engagement member 44 and the track assembly 99. Eliminating the sliding contact reduces the wear caused by the first grasping notch 124 and second grasping notch 126 of the drive lugs 118 of the track assembly 99 engaging and disengaging the engagement members 44 of the drive sprocket 22.

As the pair of shoe assemblies are moved into a position shown by shoe assembly 80I and 80J, the track assembly 99 disengages from the drive sprocket 22. In particular, as the drive sprocket 22 is rotated in the general direction of arrow 28, the engagement member 44E is moved away from the first grasping notch 124 of the shoe assembly 80I and away from the second grasping notch 126 of the shoe assembly 80J in the general direction of arrow 28. In addition, as the track assembly 99 advances in the general direction of arrow 129, the shoe assembly 80J rotates relative the shoe assembly 80I such that the upper portion of the first grasping notch 124 of the shoe assembly 80I is moved away from the second grasping notch 126 of the shoe assembly 80J. Thus, the force of the first notch 124 of the shoe assembly 80I and the force of the second notch 126 of the shoe assembly 80J are removed from the engagement member 44E allowing the engagement member 44E to disengage from the track assembly 99.

It should be appreciated that the track assembly 99 advances in a clockwise manner in the direction of arrows 128, 28, and 129 respectively due to the movement of the drive shaft 20 shown in FIG. 2, which rotates the drive sprocket 22 in the general direction of arrow 28. As the drive sprocket 22 is rotated in the general direction of arrow 28, the engagement members 44 move the track assembly 99 in the general direction of arrow 28. In particular, the shoe assemblies 80C, 80D, 80E, 80F, 80G, 80H, and 80I are fully or partially engaged to a respective pair of engagement members 44 of the drive sprocket 22 such that rotation of the drive sprocket in the general direction of arrow 28 moves the corresponding engaged shoe assembly 80 of the track assembly 99 in the general direction of arrow 28. In addition, rotation of the drive sprocket in the general direction of arrow 26 moves the corresponding engaged shoe assembly 80 of track assembly 99 in the general direction of arrow 26.

Referring now to FIGS. 4 through 6, the drive lug 118 further includes a right rail 130 and a left rail 132. The right rail 130 and the left rail 132 are steel or composite surfaces that are highly resistant to wear. The roller 62 further includes a right wheel 134 and a left wheel 136 as shown in FIG. 6. The right wheel 134 and the left wheel 136 are spaced apart such that the right wheel 134 and the left wheel 136 straddle the central drive segment 122 of the drive lug 118.

By straddling the central drive segment 122, the roller 62 is aligned with the central drive segment 122 ensuring that the track assembly 99 is properly aligned with the rollers 62 of the roller assemblies 54. It should be appreciated that each of the five rollers 62 are positioned such that the rollers 62 align the track assembly 99 with the engagement members 44 of the drive sprocket 22. Thus, alignment of the track assembly 99 with the rollers 62 aligns the track assembly 99 with the engagement members 44 of the drive sprocket 22. It should further be appreciated that large size of the drive portion 122 of the drive lugs 124 makes it less likely that the drive portion 122 will jump out of alignment with the right wheel 134 and the left wheel 136 as the track assembly 99 is advanced.

The right wheel 134 of the roller 62 is supported by the right rail 130. Similarly, the left wheel 136 is supported by the left rail 132. It should be appreciated that the rollers 62 support the entire weight of the work machine 10. It should be appreciated that the weight of the work machine supported on the right rail 130 and the left rail 132 is further supported and dispersed by the shoe 81. Dispersing the weight of the work machine 10 is an advantage of the tracked type work machine 10. The low ground pressure resulting from dispersing the weight over the shoes 81 allows the tracked type work machine 10 to operate in conditions where a wheel type work machine would be unsuitable. It should further be appreciated that the tread 83 of each shoe 81 provides traction as the track assembly 99 is moved in the general direction of arrows 128 or 129.

In the present invention, the right link 82 is spaced apart from the right rail 130 whereas the left link 92 is spaced apart from the left rail 132. Many track assembly configurations for tracked type work machines combine the functions of the right link 82 with the right rail 130 and combine functions of the left link 92 with the left rail 132.

Separating the rails 130, 132 from the links 82, 92 allows the stress of moving the rails to be primarily carried by the links 82, 92 whereas the stress of supporting the weight of the work machine 10 is primarily carried by the rails 130, 132. Thus, the links 82, 92 can be replaced independently of the rails 130 and 132 on the same shoe assembly 80.

Figure 9:
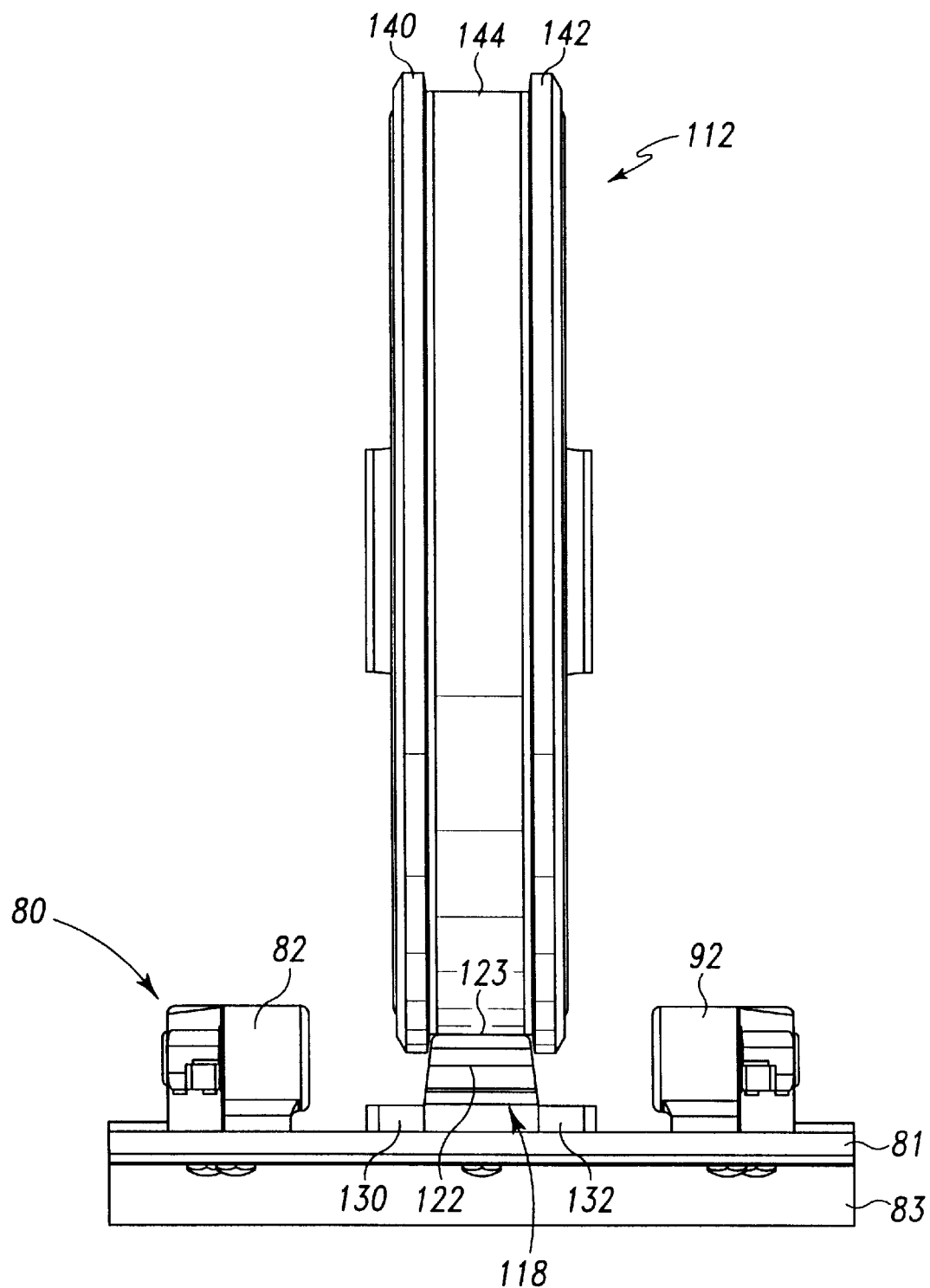
FIG. 9 is a front elevational view of a roller assembly positioned on the track assembly of FIG. 1.

Referring now to FIG. 9, the idler roller 112 further includes a right rim 140, a left rim 142, and a central portion 144. The idler roller 112 is in contact with the shoe assemblies 80 as the track assembly 99 is advanced. In particular, the central portion 144 of the idler roller 112 is in contact with an upper surface 123 of the central drive segment 122 of the drive lug 118. As shown in FIG. 1, the track assembly movably contacts approximately half or one hundred eighty degrees of the outer circumference of the idler roller 112 at any given point in time. Thus, most of the wear on the shoe assemblies 80 caused by advancing the track assembly 99 around the idler roller 112 will occur on surface 123.

It should be appreciated that the components of the shoe assembly 80 that are most likely to need replacement due to wear are all included in the drive lug 118. In particular, the first grasping notch 124 and the second grasping notch 126 are subject to wear from engaging and disengaging engagement members 44 of the drive sprocket 22 as the track assembly 99 is advanced. In addition, the rails 130, 132 are subject to wear as the rollers 62 move across the rails 130, 132. Moreover, the upper surface 123 of the drive lug 118 is subject to wear as the track assembly 99 is advanced around the idler roller 112. Thus, replacement of the drive lug 118, replaces the five components of the shoe assembly 80 that are most subject to wear: the first grasping notch 124, the second grasping notch 126, the right rail 130, the left rail 132, and the upper surface 123.

Operation of the work machine 10 in different environments causes the drive lug 118 to wear at different rates as compared to the links 82, 92. Combining multiple wear surfaces into the drive lug 118 allows the material composition of the wear surfaces to be changed without changing the links 82, 92. The track assembly 99 can be configured for the various environments by altering the material composition of a single component (i.e. the drive lugs 118). In a high wear environment, the track assembly 99 can be configured with drive lugs made of a more wear resistant material to increase the life of the drive lugs 118. In a low wear environment, the track assembly 99 can be configured with drive lugs made of a less costly less wear resistant material.

A further advantage of the present invention is that the track drive mechanism 18 can be configured for use in an abrasive environment, such an environment that includes sand, which increases the rate the rails 130, 132 wear. An advantage to flat rails 130, 132 which are not combined with the respective links 82, 92 is that a resilient material, such as rubber, can be applied to the upper surface of the rails 130, 132 in order to reduce the wear on the rails 130, 132. In addition, the resilient material may also be applied to the outer surfaces of the wheels 134, 136 which contact the rails 130, 132 to further reduce wear of the rails 130, 132 when operating in an abrasive environment. Moreover, the resilient material has the added advantage of reducing noise generated during advancement of the track assembly 99.

INDUSTRIAL APPLICABILITY

In operation, the track assembly 99 is formed by coupling the right links 82 and the left links 92 of the thirty seven shoe assemblies 80. The track assembly 99 is mounted on the work machine 10 in a manner that follows the generally oval path defined by the drive sprocket 22, the carrier roller 110, the idler roller 112, and the five rollers assemblies 54 as shown in FIG. 1. The central drive segment 122 of the drive lugs 118 of each of the shoe assemblies 80 cooperate with the first wheel 134 and the second wheel 136 of the roller assemblies 54 to align the track assembly 99 with the rollers 62 as shown in FIG. 6.

In addition, the right rail 130 and the left rail 132 of the drive lug 118 support the right wheel 134 and the left wheel 136 respectively of the roller assemblies 54 which in turn support the entire weight of the work machine 10. The rails 130, 132 transfer this weight to the shoes 81 which in turn distribute the weight of the work machine 10 over a large area. The right rail 130, left rail 132, right wheel 134, and left wheel 136 can alternately have a resilient material, such as rubber, applied thereto in order to reduce wear on the right rail 130 and left rail 132 when operating in an abrasive environment.

In order to drive the track assembly 99, the engine assembly 14 provides power to rotate a drive shaft 20 which rotates the drive sprocket 22 in the general direction of arrows 26 or 28. The power is transferred from the drive sprocket 22 to the track assembly 99 by a rotating engagement member 44 attached to the drive sprocket 22. In particular, as the track assembly 99 is advanced around the sprocket assembly 22, the first grasping notch 124 of a first shoe assembly 80 cooperates with the second grasping notch 126 of an adjacent shoe assembly 80 to engage the rotatable engagement member 44 of the drive sprocket 22. Since the engagement member 44 is free to rotate in the general direction of arrows 26 and 28 relative to the drive sprocket 22, the amount of friction and wear between the drive sprocket 22 and the track assembly 99 is reduced.

As the lower portion track assembly 99 moves in the general direction of arrows 128 or 129, the treads 83 of the each of the shoe assemblies 80 engages the ground in order to move the tracked type work machine 10. In particular, the track type work machine 10 is moved to position the work implement 16 as required for a work operation.

While the invention has been illustrated and described in detail in the drawings and foregoing description, such illustration and description is to be considered as exemplary and not restrictive in character, it being understood that only the preferred embodiment has being shown and described and that all changes and modifications that come within the spirit of the invention are desired to be protected.

For example, although the drive lugs 118 are configured as a single component, and have significant advantages thereby in the present invention, the drive lugs 118 could be embodied with the rails 130, 132 as separate components from the drive segment 122. Such a configuration would allow the rails 130, 132 to replaced independently of the drive segment 122.

Moreover, although the idler roller 112 is configured to contact the drive lugs 118 on the upper surface 123, and has significant advantages thereby in the present invention, the right rim 140 and the left rim 142 could be configured to contact the right rail 130 and the left rail 132 respectively. Such a configuration would place the wear caused by advancing the track assembly 99 around the idler roller 112 on the rails 130, 132 rather than the upper surface 123.

What is claimed is:

1. A drive mechanism for a work machine, comprising:
   a sprocket drive assembly including (i) a hub, and (ii) a plurality of engagement members each being supported by said hub; and
   a track assembly having (i) a plurality of shoes which are pivotally secured to one another to form a track, (ii) a plurality of drive lugs replaceably mounted to said plurality of shoes, said drive lugs engage said plurality of engagement members when said hub is rotated, and (iii) a support roller mechanically coupled to a chassis of said work machine, each of said drive lugs being integrally connected to a rail segment on which said support roller is supported during advancement of said track, wherein said drive lug and said rail segment are replaceably mounted to said shoe with at least one fastener.

2. The drive mechanism of claim 1, wherein:
   each of said plurality of drive lugs further includes a drive segment, and
   said drive segment contacts one of said engagement members during advancement of said track around said sprocket drive assembly.

3. The drive mechanism of claim 1, wherein:
   said track assembly further has a plurality of links, each being secured to a respective one of said plurality of shoes, said plurality of shoes includes a first shoe and a second shoe positioned adjacent each other, said plurality of links includes a first right lateral link and a second right lateral link, said first right lateral link is secured to said first shoe, said second right lateral link is secured to said second shoe, and said first right lateral link is pivotably coupled to said second right lateral link.

4. The drive mechanism of claim 3, wherein:

said plurality of links further includes a first left lateral link and a second left lateral link, said first left lateral link is secured to said first shoe, said second left lateral link is secured to said second shoe, and said first left lateral link is pivotably coupled to said second left lateral link.

5. The drive mechanism of claim 4, wherein:

said plurality of replaceable drive lugs includes a first drive lug and a second drive lug which are positioned adjacent to each other, said first drive lug is replaceably secured to said first shoe, said second drive lug is replaceably secured to said second shoe, said first drive lug is interposed between said first right lateral link and said first left lateral link, and said second drive lug is interposed between said second right lateral link and said second left lateral link.

6. The drive mechanism of claim 5, wherein:

said first drive lug is spaced apart from each of said first right lateral link and said first left lateral link.

7. The drive mechanism of claim 1, wherein:

said support roller includes a wheel which contacts said rail segment during advancement of said track.

8. The drive mechanism of claim 3, wherein:

said support roller includes a wheel which contacts said rail segment during advancement of said track, and said wheel is spaced apart from each of said first right lateral link and said first left lateral link during advancement of said track.

9. The drive mechanism of claim 2, wherein:

said drive mechanism further includes an idler roller, said idler roller contacts said drive segment during advancement of said track, and said idler roller is spaced apart from said rail segment during advancement of said track.

10. A drive mechanism for a work machine, comprising:

a sprocket drive assembly including (i) a hub, and (ii) a plurality of engagement members each being supported by said hub; and a track assembly having (i) a plurality of shoes which are secured to one another to form a track, (ii) a plurality of drive lugs which are replaceably mounted to said plurality of shoes, said drive lugs engage said plurality of engagement members when said hub is rotated, and further each of said drive lugs is integrally connected to a left lateral rail segment and a right lateral rail segment, each of said drive lugs and said rail segments being replaceably mounted to said shoes with at least one fastener, and (iii) a support roller mechanically coupled to a chassis of said work machine, said support roller includes a left wheel and a right wheel, and said left wheel is supported by said left lateral rail segment during advancement of said track, and further said right wheel is supported by said right lateral rail segment during advancement of said track.

11. The drive mechanism of claim 10, wherein:

each of said plurality of drive lugs further includes a central drive segment interposed between said left lateral rail segment and said right lateral rail segment, and said central drive segment contacts one of said engagement members during advancement of said track around said sprocket drive assembly.

12. The drive mechanism of claim 10, wherein:

said track assembly further has a plurality of links, each being secured to a respective one of said plurality of shoes, said plurality of shoes includes a first shoe and a second shoe positioned adjacent each other, said plurality of links includes a first right lateral link and a second right lateral link, said first right lateral link is secured to said first shoe, said second right lateral link is secured to said second shoe, and said first right lateral link is pivotably coupled to said second right lateral link.

13. The drive mechanism of claim 12, wherein:

said plurality of links further includes a first left lateral link and a second left lateral link, said first left lateral link is secured to said first shoe, said second left lateral link is secured to said second shoe, and said first left lateral link is pivotably coupled to said second left lateral link.

14. The drive mechanism of claim 13, wherein:

said plurality of replaceable drive lugs includes a first drive lug and a second drive lug which are positioned adjacent to each other, said first drive lug is replaceably secured to said first shoe, said second drive lug is replaceably secured to said second shoe, said first drive lug is interposed between said first right lateral link and said first left lateral link, and said second drive lug is interposed between said second right lateral link and said second left lateral link.

15. The drive mechanism of claim 14, wherein:

said first drive lug includes a first central drive segment, a first right lateral rail segment, and a first left lateral rail segment, said second drive lug includes a second central drive segment, a second right lateral rail segment, and a second left lateral rail segment, said first right lateral rail segment is spaced apart from said first right lateral link during advancement of said track, said first left lateral rail segment is spaced apart from said first left lateral link during advancement of said track, said second right lateral rail segment is spaced apart from said second right lateral link during advancement of said track, and said second left lateral rail segment is spaced apart from said second left lateral link during advancement of said track.

16. The drive mechanism of claim 15, wherein:

said right wheel is spaced apart from said first right lateral link and said first left lateral link during advancement of said track, and said left wheel is spaced apart from said first right lateral link and said first left lateral link during advancement of said track.

17. The drive mechanism of claim 10, wherein:

each of said plurality of drive lugs includes a central drive section, and said central drive section is interposed between said right wheel and said left wheel to guide said track during advancement thereof.

18. The drive mechanism of claim 15, wherein:

said drive mechanism further includes an idler roller, said idler roller contacts said central drive segment during advancement of said track, said idler roller is spaced apart from said first right lateral rail segment during advancement of said track, said idler roller is spaced apart from said first left lateral rail segment during advancement of said track, said idler roller is spaced apart from said second right lateral rail segment during advancement of said track, and said idler roller is spaced apart from said second left lateral rail segment during advancement of said track.

* * * * *